(12) United States Patent
Albisu

(10) Patent No.: US 10,212,207 B2
(45) Date of Patent: Feb. 19, 2019

(54) METHOD AND APPARATUS FOR ACCESSING DEVICES AND SERVICES

(71) Applicant: AT&T Intellectual Property I, LP, Atlanta, GA (US)

(72) Inventor: Luis Francisco Albisu, Fairfax Station, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 467 days.

(21) Appl. No.: 13/972,225

(22) Filed: Aug. 21, 2013

(65) Prior Publication Data
US 2015/0058447 A1    Feb. 26, 2015

(51) Int. Cl.
| | |
|---|---|
| H04M 3/00 | (2006.01) |
| H04M 1/66 | (2006.01) |
| G10L 15/00 | (2013.01) |
| H04N 21/25 | (2011.01) |
| H04N 21/24 | (2011.01) |
| G10L 15/18 | (2013.01) |

(Continued)

(52) U.S. Cl.
CPC ............ *H04L 67/02* (2013.01); *G06F 21/32* (2013.01); *H04L 12/2818* (2013.01); *H04L 65/1016* (2013.01); *H04L 65/1059* (2013.01); *H04L 65/1086* (2013.01); *H04L 65/1096* (2013.01); *H04L 67/125* (2013.01); *H04L 63/0861* (2013.01); *H04L 67/025* (2013.01); *H04W 12/06* (2013.01); *H04W 12/08* (2013.01)

(58) Field of Classification Search
CPC ....................................... H04L 67/02
USPC ........................................... 709/219
See application file for complete search history.

(56) References Cited

U.S. PATENT DOCUMENTS

| | | | |
|---|---|---|---|
| 6,594,484 B1 * | 7/2003 | Hitchings, Jr. ....... | H04M 3/493 379/67.1 |
| 7,277,726 B2 | 10/2007 | Ahya et al. | |

(Continued)

OTHER PUBLICATIONS

Ayres, et al., "Voice activated command and control with speech recognition over WiFi", Science of Computer Programming, 59.1, 2006, 109-126.

(Continued)

*Primary Examiner* — Esther B. Henderson
*Assistant Examiner* — Golam Mahmud
(74) *Attorney, Agent, or Firm* — Guntin & Gust, PLC; Joseph Hrutka

(57) ABSTRACT

A method that incorporates teachings of the subject disclosure may include, for example receiving an audio command from a mobile communication device via a first communication network for performing audio control of a remote device, converting the audio command to a text command, comparing the text command to a plurality of script commands associated with a script library to at least approximately match the text command to a first script command of the plurality of script commands, retrieving a first script from the script library according to the first script command, and transmitting a control message relating to the control message to an application programming interface service of a computing device via a second communication network, where the application programming interface service is configured to direct the remote device to perform a function according to the control message. Other embodiments are disclosed.

20 Claims, 7 Drawing Sheets

(51) Int. Cl.
*H04L 29/08* (2006.01)
*H04L 29/06* (2006.01)
*H04L 12/28* (2006.01)
*G06F 21/32* (2013.01)
*H04W 12/06* (2009.01)
*H04W 12/08* (2009.01)

(56) References Cited

U.S. PATENT DOCUMENTS

| | | | |
|---|---|---|---|
| 7,415,100 B2 * | 8/2008 | Cooper | H04M 3/527 379/88.01 |
| 7,512,567 B2 | 3/2009 | Bemmel et al. | |
| 7,526,286 B1 * | 4/2009 | Allen, Jr. | H04M 1/72533 455/411 |
| 7,844,684 B2 * | 11/2010 | Pettinato | G06F 9/542 709/217 |
| 8,041,372 B1 * | 10/2011 | Minns | G06F 17/3087 455/414.3 |
| 8,166,121 B2 | 4/2012 | Farrell et al. | |
| 8,223,932 B2 | 7/2012 | Forbes et al. | |
| 8,301,723 B2 | 10/2012 | King | |
| 8,812,056 B2 * | 8/2014 | Higginbotham | G10L 13/043 455/563 |
| 2002/0095294 A1 | 7/2002 | Korfin et al. | |
| 2003/0231745 A1 * | 12/2003 | Colson | H04M 3/382 379/88.01 |
| 2003/0234809 A1 | 12/2003 | Parker et al. | |
| 2006/0092041 A1 | 5/2006 | Leman et al. | |
| 2006/0276230 A1 | 12/2006 | McConnell | |
| 2007/0173237 A1 * | 7/2007 | Roundtree | H04W 4/18 455/414.1 |
| 2007/0265850 A1 * | 11/2007 | Kennewick | G10L 15/22 704/257 |
| 2009/0006100 A1 | 1/2009 | Badger et al. | |
| 2009/0182716 A1 * | 7/2009 | Everhart | G06Q 10/10 |
| 2010/0021001 A1 * | 1/2010 | Honsinger | G06T 1/0028 382/100 |
| 2011/0035220 A1 * | 2/2011 | Opaluch | G10L 15/265 704/246 |
| 2011/0228763 A1 * | 9/2011 | Magnus | H04M 1/72561 370/352 |
| 2012/0084834 A1 * | 4/2012 | Brown | H04W 4/021 726/3 |
| 2012/0110127 A1 * | 5/2012 | Morris | H04N 21/4126 709/219 |
| 2012/0110557 A1 * | 5/2012 | Singh | G06F 8/75 717/133 |
| 2012/0159167 A1 * | 6/2012 | Lee | H04L 9/321 713/168 |
| 2012/0173238 A1 * | 7/2012 | Mickelsen | G10L 15/30 704/246 |
| 2012/0221860 A1 * | 8/2012 | Hoornaert | G06F 21/34 713/172 |
| 2013/0034220 A1 * | 2/2013 | Ozeri | H04M 15/06 379/142.06 |
| 2013/0139193 A1 * | 5/2013 | Fan | H04N 7/157 725/14 |
| 2013/0325884 A1 * | 12/2013 | Soel | G06F 17/2211 707/758 |
| 2014/0197232 A1 * | 7/2014 | Birkler | G06F 21/313 235/375 |

OTHER PUBLICATIONS

Cohen, "Embedded speech recognition applications in mobile phones: Status, trends, and challenges", Acoustics, Speech and Signal Processing, 2008, 5352, 5355.

Rojas-Rodriguez, et al., "Development and Integration of Automated Systems Aimed to the Comfort of Seniors and People with Disabilities", Intelligent Environments (IE), 2012, 339, 342, 26-29.

Yuksekkaya, et al., "A GSM, internet and speech controlled wireless interactive home automation system", Consumer Electronics, IEEE Transactions, vol. 52, No. 3, 2006, 837, 843.

* cited by examiner

METHOD AND APPARATUS FOR ACCESSING DEVICES AND SERVICES

FIELD OF THE DISCLOSURE

The subject disclosure relates to a method and apparatus for accessing devices and services.

BACKGROUND

Modern telecommunications systems allow consumers to utilize telephony capabilities while accessing a large variety of content. Consumers are no longer bound to specific locations when communicating with others or when enjoying content, including video programming. Network capabilities have expanded and have created additional interconnections and new opportunities for using mobile communication devices in a variety of situations. Intelligent devices offer new means for the enjoyment of network interactions in ways that anticipate consumer desires.

BRIEF DESCRIPTION OF THE DRAWINGS

Reference will now be made to the accompanying drawings, which are not necessarily drawn to scale, and wherein.

DETAILED DESCRIPTION

Figure 1:
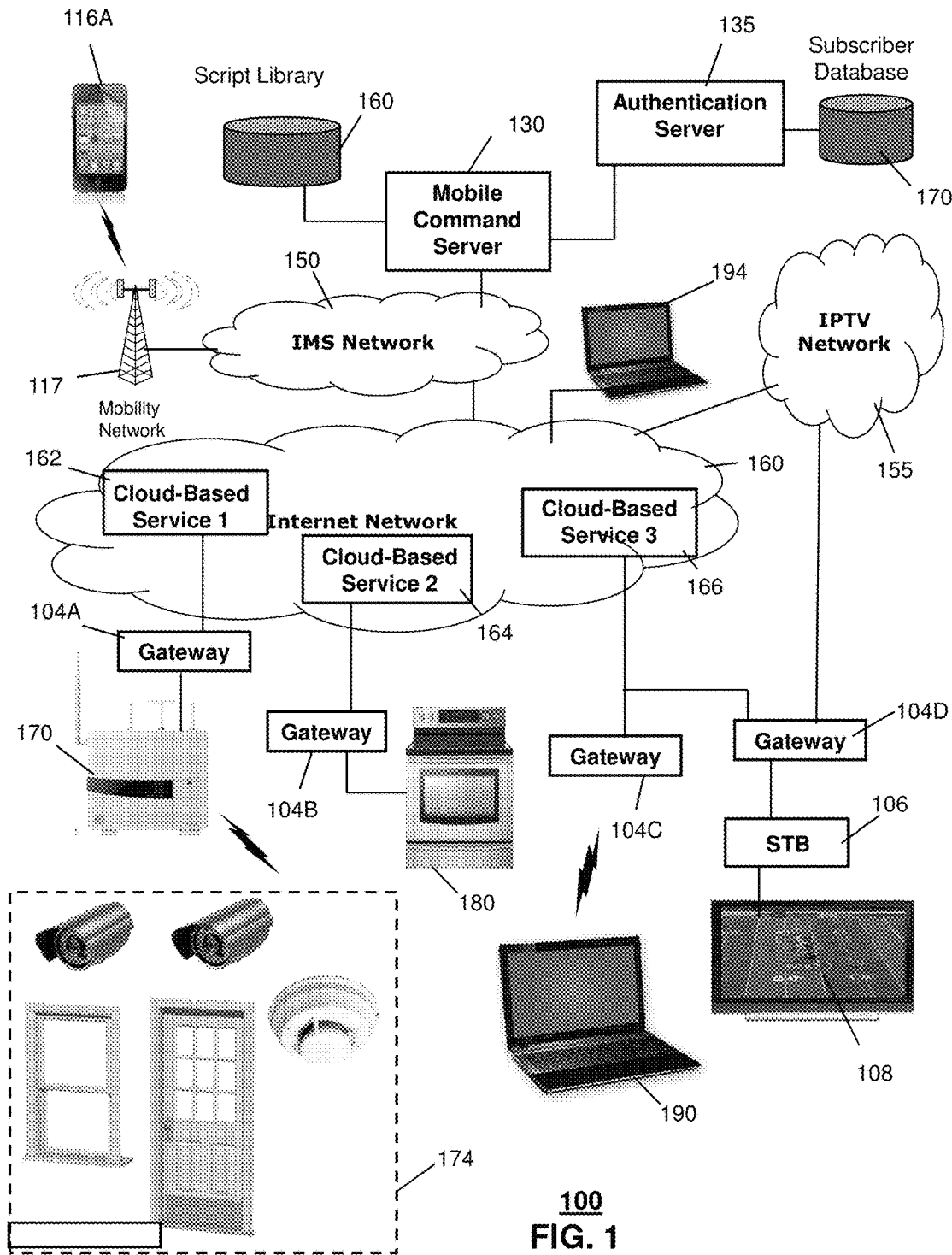
FIG. 1 depicts illustrative embodiments of a system that can be utilized for providing remote control of devices and services via mobile communication devices.

The subject disclosure describes, among other things, illustrative embodiments for receiving an audio command from a mobile communication device for remotely controlling devices or services, determining a script command according to the audio command, and transmitting a control message to a remote device according to the script command. Other embodiments are included in the subject disclosure.

One embodiment of the subject disclosure includes a method including authenticating, by a system comprising a processor, a mobile communication device associated with a subscriber via a first communication network for performing audio control of a remote device associated with the subscriber. The method can also include receiving, by the system, an audio command from the mobile communication device via the first communication network and converting the audio command to a text command. The method can further include comparing, by the system, the text command to a plurality of script commands associated with a script library to at least approximately match the text command to a first script command of the plurality of script commands, retrieving a first script from the script library according to the first script command and, in turn, generating a control message according to the first script. The method can include transmitting, by the system, the control message to an application programming interface service of a computing device via a second communication network, where the application programming interface service can direct the remote device to perform a function according to the control message. The method can also include receiving, by the system, a response message from the application programming interface service via the second communication network indicating a status associated with performance of the function by the remote device.

One embodiment of the subject disclosure includes a device comprising a memory to store executable instructions and a processor. The processor, responsive to executing the executable instructions, can perform operations including receiving subscriber information at a web portal and authenticating the subscriber information according to a subscriber database to enable modification of a script library. The processor can also performs operations comprising receiving a script command for causing execution of a first script in the script library responsive to receiving an audio command from a mobile communication device, where a speech to text conversion of the audio command can generate a text command that at least approximately matches the script command. The processor can further perform operations comprising receiving a selection of a script entry mode for the first script at the web portal, receiving entry of the first script at the web portal according to the script entry mode, and, in turn, storing the first script in the script library for subsequent executing of the first script.

One embodiment of the subject disclosure includes a computer-readable storage device, comprising executable instructions. The executable instructions can cause a processor to perform operations comprising receiving an audio command from a mobile communication device via a first communication network for performing audio control of a remote device and converting the audio command to a text command. The executable instructions can further cause the processor to perform operations comprising comparing the text command to a plurality of script commands associated with a script library to at least approximately match the text command to a first script command of the plurality of script commands. The executable instructions can also cause the processor to perform operations comprising retrieving a first script from the script library according to the first script command and, in turn, transmitting a control message relating to the first script to an application programming interface service of a computing device via a second communication network. The application programming interface service can direct the remote device to perform a function according to the control message.

FIG. 1 depicts an illustrative embodiment of a system 100 that can be utilized for controlling devices remotely using a mobile communication device via a communication network. In one embodiment, the system 100 can include several communication and information networks 150, 155, and 160. The system 100 can include a subscription telecommunication service, such as an Internet Protocol Multimedia Subsystem (IMS) network 150 for providing cellular/mobile communications, Internet access, and content to mobile communication devices 116A via a mobility network of mobile base stations 117. The system can include a subscription content service, such as an Internet Protocol Television (IPTV) network 155 for providing media content to subscribers. The IPTV network 155 can be part of a cable, satellite, or DSL based media content delivery system. The media content can be any type of viewable content, such as broadcast television, cable or premium television, video on demand, or pay-per-per view television. The IPTV network 155 can deliver media content to media processing devices 106 and media display devices 108 at subscriber locations via gateway devices 104D. The system can include the Internet network 160 with access to the World-wide web (WWW) and cloud-based services 162, 164, and 166.

In one embodiment, the system 100 can include one or more servers 130 and 135 associated with the IMS network 150. In one embodiment, a mobile command server 130 can receive communications from mobile communication devices 116A over the IMS network 150. The mobile command server 130 can provide voice or audio command services to the mobile communication device 116A. Simple voice commands can be captured at the mobile communication device 116A for the purpose of controlling devices and/or services at a subscriber's premises and/or accessible via the cloud or Internet 160. The mobile command server 130 performs an authentication process to insure that the voice commands are originating from the subscriber. The mobile command server 130 can then match the received voice commands to preconfigured scripts at a script library 170. The scripts can provide one or more machine and/or network commands that can control remote functions, such as cloud-based services 162, and/or remote devices, such as home security systems 170.

A mobile communication device 116A can access a mobile command server 130 by entering a code or phone number, such as "211" or "411." Alternatively, the mobile communication device 116 can include a hot key or defined key that allows for a single key access to the mobile command server 130. Responsive to the entry of the code, the IMS network 150 can establish a connection between the mobile communication device 116A and the mobile command server 130.

The mobile command server 130 can verify that the caller on the mobile communication device 116A is an authorized subscriber and, in particular, is a subscriber that is authorized to command specific devices and/or services. The mobile command server 130 can perform an authentication process for the subscriber. The authentication process can include a single factor of verification or can include multiple factors of verification. In one embodiment, the mobile command server 130 can access information from the call session between the mobile communication device 116 and the mobile command server 130. The mobile command server 130 can receive, from the IMS network 150, information identifying the mobile communication device 116A, including the device's telephone number, a machine identification code, and/or identification of the base station 117 used for the call. The mobile command server 130 can determine if the identifying information is associated a subscriber of the IMS system 150. The mobile command server 130 can requested that an authentication server 135 compare the mobile communication device 116A telephone number and/or a machine identification code to a subscriber database 170. The subscriber database 170 can return an identification of a subscriber based on the identifying information. If the mobile command server 130 determines that the mobile communication device 116A that is requesting the mobile command service is associated with a valid subscriber to the system, then the mobile command server 130 can enable access to the mobile command service. The mobile command server 130 can require an additional level of authentication by verifying that the subscriber's account is configured to allow mobile commands. It may be desirable for some subscribers to turn off the mobile command function, such as in cases where a mobile communication device 116A is possessed by a minor or by an estranged family member. The mobile command server 130 can request that the authentication server 135 check the configuration of a subscriber profile in the subscriber database 170 to verify the configuration.

In one embodiment, the mobile command server 130 can provide one or more additional layers of authentication factors. The mobile command server 130 can require that the mobile communication device 116A provide an image of the subscriber for verification against the subscriber database 170. The mobile command server 130 can direct the mobile communication device to an image capture mode, where the user facing camera is activated to capture an image of the face of the person who is using the mobile communication device 116A. Alternatively, the mobile command server 130 can wait for the mobile communication device 116A to send a "fresh" image that has been captured by the device camera function in the past few minutes, where a timestamp on the image guarantees the mobile command server 130 that the image is recent. The mobile communication device 116A can send the image to the mobile command server 130. If the call from the mobile communication device 116A to the mobile command server 130 is a video call, then the mobile command server 130 can simply capture an image of the caller's face. The mobile command server 130 can request that the authentication server 135 compare the captured image to images stored in the subscriber database 170. The image can be that of the subscriber's face. Alternatively, the image can of an identifying mark, such as a tattoo. The authentication server can compare the captured image to the known images in the subscriber database 170 to verify that the person currently operating the mobile communication device 116A is, in fact, the subscriber.

In one embodiment, the mobile command server 130 can verify the identity of the operator of the mobile communication device 130 by voice recognition. The mobile command server 130 can obtain a sample of the caller's voice by capturing the communication between the caller and the mobile command server 130. The mobile command server 130 can ask the caller to state his or her name and/or to say a common word that has been used for gathering voice samples that are stored in the subscriber database 170. The mobile command server 130 can request that the authentication server 135 compare the captured voice sample to voice samples stored in the subscriber database 170. The authentication server can compare the captured voice to the known voice samples in the subscriber database 170 to verify that the person currently operating the mobile communication device 116A is, in fact, the subscriber.

In one embodiment, a single factor of authentication, such as calling information, captured image, or captured voice sample, is used for verifying the identity of the caller at the mobile communication device. In another embodiment, multiple factors can be combined to enhance the security of the verification. The mobile command server 130 can require that the caller pass a combination of any or all factors verifications, such as verifying the telephone number of the calling mobile communication device 116A and verifying the caller's voice.

Once the call from the mobile communication device 116A is authenticated, then the mobile command server 130 can provide a voice-based interface for the caller to interact with the system 150. The mobile command server 130 can provide a greeting, such as, "This is AT&T mobile command center, what may I help you with?" The mobile command server 130 can provide a conversational interface, where a subscriber is asked for information, is provided with options, and is given a chance to provide a command. The interface can include artificial intelligence features to adapt the command process to specific configurations and/or command history for the subscriber. The mobile command server 130 can anticipate the menu selections of a subscriber based on past command sessions.

The mobile command server 130 receives a voice command from the mobile communication device 116A. The voice command can be in the form of a single word, a phrase, a sentence, or a combination of sentences. The voice command can be include numbers or variables that direct remote devices and/or services to specific settings, such as specific television channels or thermostat temperatures.

The mobile command server 130 can convert the voice command to a text command. The mobile command server 130 can perform the conversion using a voice recognition algorithm that converts audio words and/or phrases into text words and/or phrases. In one alternative, the mobile communication device 116A can convert the voice command from audio to text using a voice recognition application that is resident at the mobile communication device 116A. The mobile communication device 116A can then send the text as a text message or email to the mobile command server 130.

Once the mobile command server 130 has converted the voice command to a text command, the mobile command server 130 can compare the text command to a set of script commands at a script library 160. Each script command in the script library 160 can be a word, phrase, sentence, or combination of sentences that is associated with a preconfigured script of functions, commands, and/or operations. For example, a script in the script library 160 can be associated with the phrase "deactivate for Jane." The script that is associated with "deactivate for Jane" can include function calls to a cloud-based service 162 that commands a home security controller 170 at Jane's house to deactivate an alarm system 174 for a period of time and then automatically reactivate the system. The script can contain a series of commands and functional decisions that send and receive messages with the cloud-based security service. All of these commands and functions are preconfigured to operate in a sequence for executing the deactivation and reactivation of Jane's security system. The script library associates this script to the simple phrase, "deactivate for Jane." which can easily be spoken by Jane into her mobile communication device 116A and converted to a searchable text by the mobile command server 130.

The mobile command server 130 can compare the text command to the script library to find a matching script command. The matching can be approximate, to account for uncertainty in the voice-to-text conversion process. For example, the mobile command server 130 determine that the resulting voice-to-text conversion phrase of "deactivate or chain" is sufficiently close to the correct phrase of "deactivate for Jane" to constitute a match. Once the mobile command server 130 finds a script command that matches the text command, the mobile command server 130 retrieves the script that is associated with the script command from the library 160. If the mobile command server 130 is not able to sufficiently match the text command to a script command, then the mobile command server 130 notifies the caller that the requested command cannot be found. In one embodiment, the mobile command server 130 can repeat back to the caller the text command that the mobile command server 130 has generated from the voice-text conversion so that the caller receives immediate feedback indicating how the mobile command server 130 is handling the conversion. In the case above, the caller can realize that they are speaking the phrase "deactivate for Jane" unclearly or that the phrase that they have chosen is subject to easy confusion by the voice-to-text converter and, perhaps, should be replaced with an easier phrase.

The mobile command server 130 can parse the text command for variables and/or numbers that used for configuring a remote device and/or process. For example, the caller can speak the phrase, "Set oven to 375 degrees." The caller intends for the mobile command server 130 to execute a script that commands an oven 180 in the caller's house to change its set point. However, in this case, the text command is not a fixed phrase since the number "375" can vary. Therefore, the mobile command server 130 can parse the phrase to detect the variable "375." Upon recognizing the presence of the number, the mobile command server 130 can clip the phrase down to "Set oven to" and attempt to match the text phrase "Set oven to" to script commands in the script library. When the mobile command server 130 matches the text command to the script command and retrieves the "Set oven to" script, then the mobile command server 130 can provide the detected number, "375," to the script. The number can be used in the script as an input variable in a function call to a cloud-based server 164 that communicates with the oven 180 by way of a gateway 104B at the house.

The script of that is retrieved by the mobile command server 130 can include commands and/or function calls that implement necessary steps for completing the desired command at the remote device and/or service. In one embodiment, the script can include a function for sending a control message to an application programming interface (API) service that is associated with a cloud-based service 166. For example, a home security service can operate as a cloud-based service 162 that can be accessed via the Internet network 160. The mobile command server 130 can execute script functions for connecting to the cloud-based security service 162. The script functions can include calls to externalized API functions of the security cloud-based service 162. In one embodiment, an API function call can include information that identifies the subscriber or an account of the subscriber with the security provider. The mobile command server 130 can send the API function call to security cloud-based service 162, which determines if the command is valid by authenticating the subscriber or account information against a database. The security cloud-based service 162 can respond to the API function call with API function returns that report the status of the command. The mobile command server 130 can perform API calls and returns to establish connectivity with the cloud-based service 162, to execute specific functions, to receive status information, and/or to handle exceptions. In one embodiment, the mobile command server 130 can receive status information, such as determining if a home security controller 170 is enabled. The mobile command server 130 can report to the mobile communication device 116A on the status of requests commands and/or on the status of the remote system 170 and 174.

The script can execute a variety of command sequences by connecting to various resources via the Internet network 160. The mobile command server 130 can receive voice commands from mobile communication devices 116A and, in response, control and communicate with a large variety of complex, remote devices, services, and/or processes. The script can include functions to command devices 170, 180, 190, and 106 to perform operations. For example, the script can direct a home appliance cloud-based service 164 to control an oven or other smart appliance. The script can direct a cloud-based media storage service 166 to upload data from a home computer 190. The script can direct a media processor device 106 to download media content from a service provider by controlling the media processor device 106 using a cloud-based service or by directing the media processor device 106 by communicating with the IPTV network.

In one embodiment, the mobile command server 130 can be configured by accessing a web portal to the mobile command server 130. The web portal is accessible to mobile communication devices 116A or other computer devices 194 by logging onto the web portal. The portal can verify a user name and password that have been established for subscribers to the IMS network 150. The web portal can display a graphic user interface screen that can allow a subscriber to add, delete, and/or modify scripts. The web portal can also allow a subscriber to enter a text command that the subscriber desires to utilize as a voice command for controlling remote devices and/or services. For example, the web portal allows a subscriber to enter a text command, "Turn to channel $1," where "$1" is a parameter or variable that subscriber will provide when she speaks the voice command (e.g., "Turn to channel 32"). At run-time, the mobile command server 130 can automatically interpret this type of command as a parameter-including command. The mobile command server will (1) search the script database for "Turn to channel" and (2) will insert the supplied parameter (e.g., "32") into the externalized API call to control the remote device that is being commanded.

The web portal of the mobile command server 130 can provide any of several options for selecting, adding, editing, and/or deleting scripts from the script library. In one embodiment, a subscriber can enter or modify scripts according to a free form mode. In free form mode, the subscriber creates the script of operational steps using a script programming language, such as Perl, PHP, or Shell. The mobile command server 130 can be directed, via the script, to connect to a resource, such as a cloud-based service 162, to provide authentication to the resource, and to execute functional calls to the resource. In the free form method, the subscriber is responsible to code each step into the script using the script programming language.

In another embodiment, a subscriber can enter or modify scripts according to an assisted entry mode. In the assisted entry mode, the mobile command server provides an interface that guides the subscriber through steps required for attaching to a remote system resource. The script is, again, created from a script programming language. However, the web portal application fills in the necessary script programming code according to subscriber choices and selections that occur as the subscriber is guided through the steps. In another embodiment, the subscriber can enter logical IF/THEN/ELSE statements, which the web portal application of the mobile command server 130 converts into script language code.

In another embodiment, a subscriber can enter or modify scripts according to a prepopulated mode. In the prepopulate mode, the subscriber selects from preconfigured services that are available from one or more cloud-based services 162. Each cloud-based service 162, 164, and 166 can generate a set of preconfigured, externalized API functions that control known features of their services. For example, a home security system cloud-based service 162 can have preconfigured actions such as, "Open Garage Door" or "Turn on Porch Light." The cloud-based service 162 can have externalized API functions that are available for calling by an authenticated client and that will cause the home security system 170 and 174 to perform the function without further intervention. Similarly, a media content provider cloud-based service 166 can have preconfigured, externalized API functions such as, "Record Show $Title" that records a program according to the $Title variable without further intervention or scripting. The web portal application of the mobile command server 130 can provide lists of preconfigured functions for various cloud-based services and can arrange the lists according to subject and/or cloud-based service. The web portal allows the subscriber to simply select which functions that they wish to execute in a script that the subscriber has associated with a text command.

In one embodiment, the web portal application of the mobile command server 130 can allow the subscriber to test individual functions and/or completed scripts by executing via the web portal to allow the subscriber to verify that the script is correctly generated to control the remote device and/or service.

Figure 2:
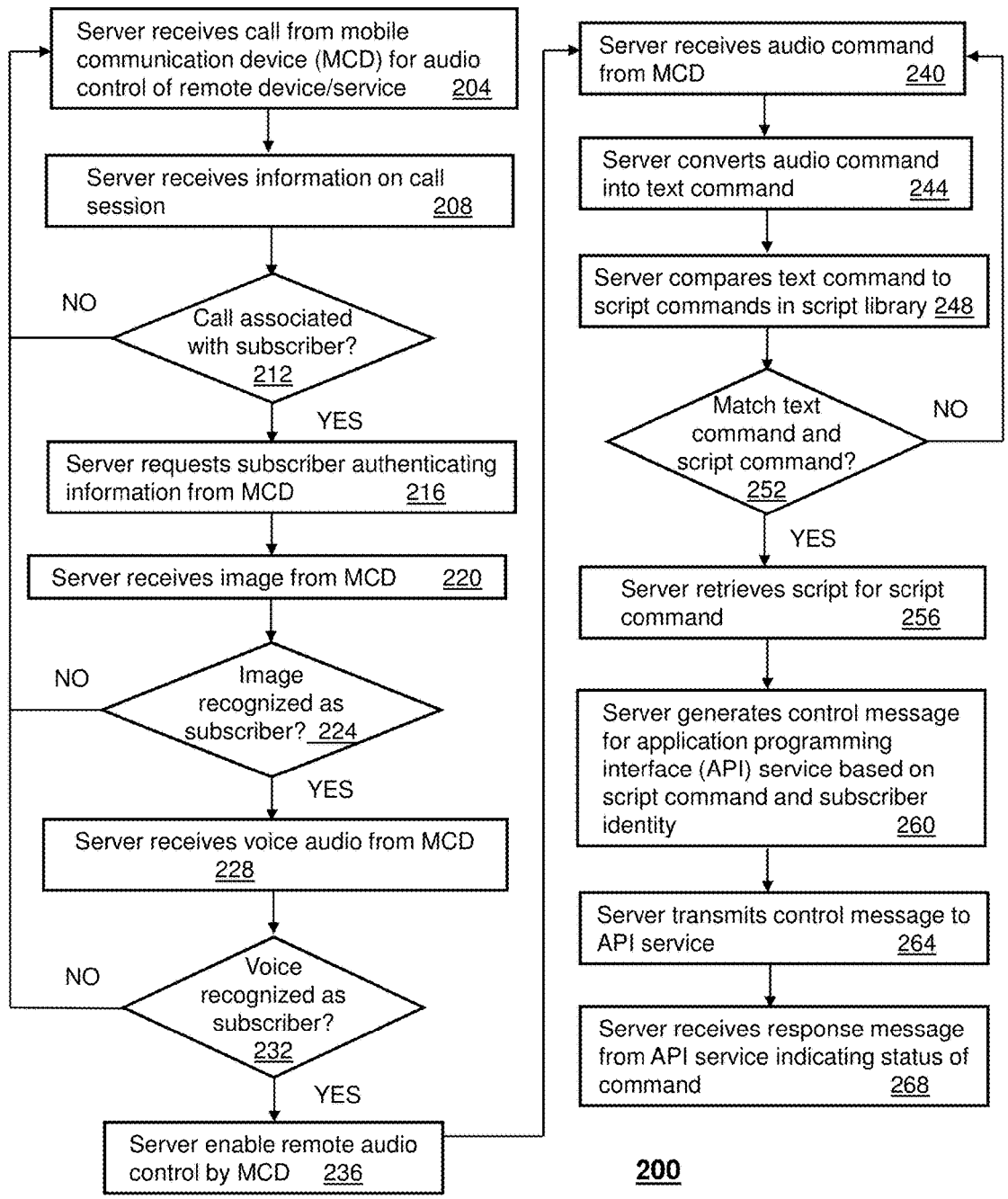
FIGS. 2-3 depicts an illustrative embodiment of a method operating in portions of the system described in FIGS. 1-2 and 4-5.
Figure 4:
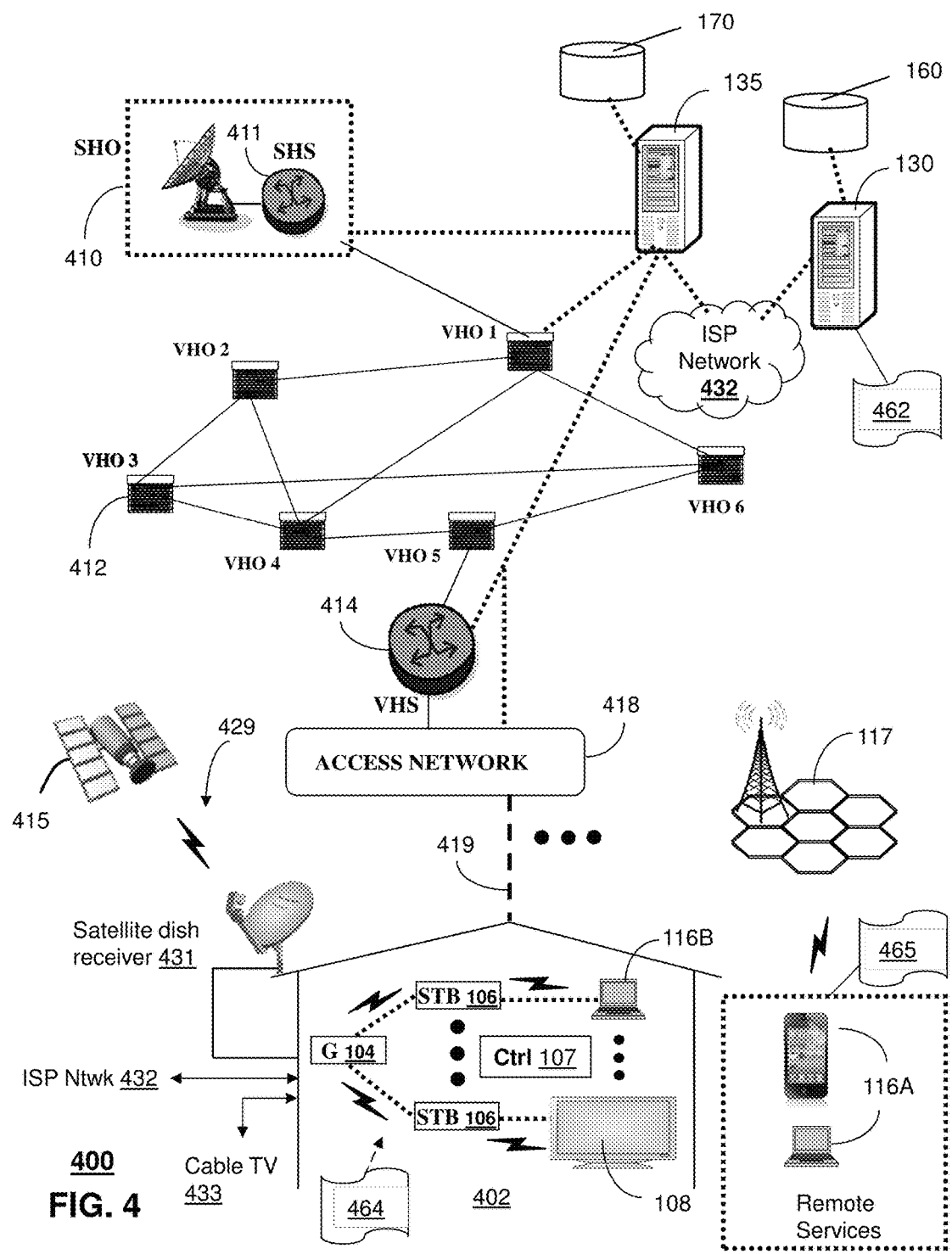
FIGS. 4-5 depict illustrative embodiments of communication systems that access and control remote devices and services according to embodiments illustrated in FIGS. 1-3.
Figure 5:
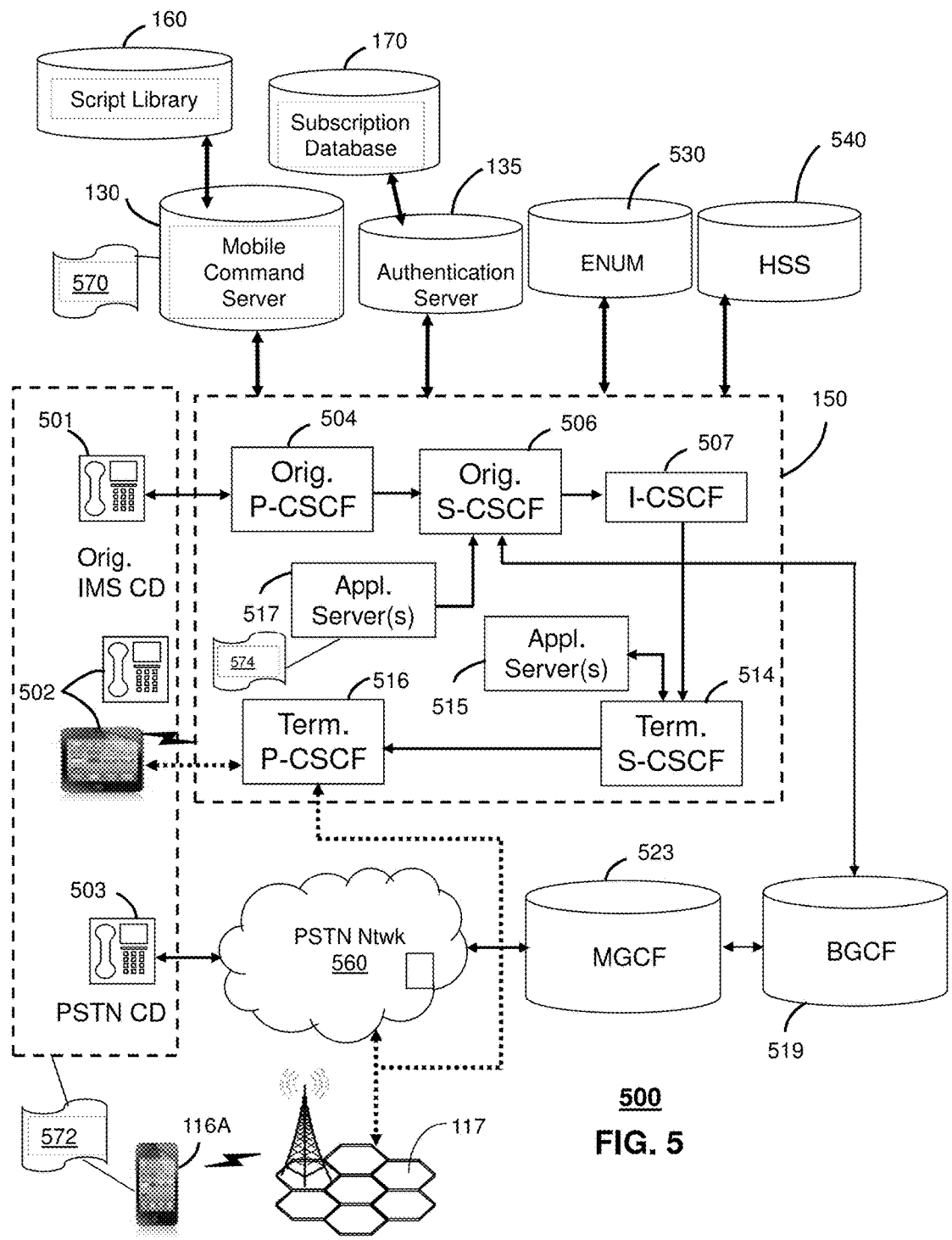

FIG. 2 depicts an illustrative embodiment of a method operating in portions of the systems and devices described in FIGS. 1 and 4-5. Method 200 can begin with step 204, in which a mobile command server 130 can receive a call from a mobile communication device 116A for enabling the mobile communication device 116A to control a remote device and/or service via audio control. In one embodiment, the call can be initiated by the mobile communication device 116A when a telephone number or a code is entered at the device. In another embodiment, the call can be initiated by the selection of a hot key or via a voice command to the mobile communication device 116A. Responsive to the initiating action at the mobile communication device 116A, the IMS system 150 initiates a call session between the mobile communication device 116A and the mobile command server 130.

The mobile command server 130 can accept the call and initiate an authentication process in step 208, where the mobile command server 130 receives information on the call session. In one embodiment, the IMS system 150 can report the telephone number or other identifying numbers associated with the mobile communication device 116A to the mobile command server 130. In another embodiment, a user interface at the mobile command server 130 can request information from the caller, such as the caller's name. In step, the 212, the mobile command server 130 can determine if the call involving the mobile communication device 116A is associated with a subscriber of the IMS system 150. In one embodiment, the mobile command server 130 can request that an authentication server 135 determine the subscriber's identity from information available from the call session, such as the telephone number of the mobile communication device 116A. In another embodiment, the authentication server 135 can determine if the subscriber's account is configured to support audio/voice control of remote devices and/or services.

If the call is associated with a subscriber of the IMS system 150, in step 212, then, in step 216, the mobile command server 130 requests authenticating information from the subscriber at the mobile communication device 116A. In one embodiment, the mobile command server 130 can transmit audible instructions to the mobile communication device 116A requesting the information that is needed.

In another embodiment, a SMS text message can be sent to the mobile communication device 116A with instructions.

The mobile command server 130 can request that the subscriber provide an image to authenticate their identity. In one embodiment, the subscriber can be directed to capture an image with the camera function of the mobile communication device 116A and to forward this image to the mobile command server 130. In one embodiment, the initiation of the voice command call session cause the mobile communication device 116A to enter an authentication mode that automatically activates the camera and that automatically transmits a captured camera image to the mobile command server 130. In another embodiment, the mobile command server 130 requires that the image be that of the subscriber's face. In another embodiment, the subscriber can send a different but identifying image.

In step 220, the mobile command server 130 can receive the captured image from the mobile communication device 116A. In step 224, the mobile command server 130 can compare the image to images stored in a subscriber database 170. The image can be that of the subscriber's face or another identifying mark or image. The authentication server can compare the captured image to the known images in the subscriber database 170 to verify that the person currently operating the mobile communication device 116A is, in fact, the subscriber.

The mobile command server 130 can request a voice sample from the subscriber in step 228. The mobile command server 130 can obtain the voice sample by capturing communications between the subscriber and the mobile command server 130 during the call session. The subscriber can be asked to state his or her name and/or to say a common word that has been used for gathering voice samples that are stored in the subscriber database 170. In step 232, the mobile command server 130 can request that the authentication server 135 compare the captured voice sample to voice samples stored in the subscriber database 170. The authentication server can compare the captured voice to the known voice samples in the subscriber database 170 to verify that the person currently operating the mobile communication device 116A is, in fact, the subscriber.

In one embodiment, a single factor of authentication, such as calling information, captured image, or captured voice sample, is used for verifying the identity of the caller at the mobile communication device. In another embodiment, multiple factors can be combined to enhance the security of the verification. The mobile command server 130 can require verification of any one of the three factors of device information, image recognition, and voice recognition or can require any combination of the three factors before enabling remote voice/audio control functionality in step 236.

In step 240, the mobile command server 130 can receive a voice command from the mobile communication device 116A. The voice command can be in the form of a single word, a phrase, a sentence, or a combination of sentences. In one embodiment, the voice command can include numbers or variables that direct remote devices and/or services to specific settings, such as specific television channels or thermostat temperatures.

In step 244, the mobile command server 130 can convert the voice command to a text command. In one embodiment, the mobile command server 130 can perform the conversion using a voice recognition algorithm that converts audio words and/or phrases into text words and/or phrases. In one embodiment, the mobile command server 130 can parse the text command for variables and/or numbers that used for configuring a remote device and/or process. Upon recognizing the presence of the variable, the mobile command server 130 can search for the non-variable part of the text command in the script library. When the mobile command server 130 matches the non-variable part of the text command to a script command and retrieves the associated script, then the mobile command server 130 can insert the detected variable into the script.

In step 248, the mobile command server 130 can compare the text command to a set of script commands at a script library 160. The matching can be approximate, to account for uncertainty in the voice-to-text conversion process. Once the mobile command server 130 determines a script command that matches the text command, the mobile command server 130 can retrieve the script that is associated with the script command from the library 160 at step 256.

The script of that is retrieved by the mobile command server 130 can include commands and/or function calls that implement necessary steps for completing the desired command at the remote device and/or service. In step 260, the mobile command server 130 can generate a control message for a control message for an application programming interface (API) service that is associated with a cloud-based service 166. In one embodiment, an API function call can include information that identifies the subscriber or an account of the subscriber with the cloud-based service, which determines if an API command is valid by authenticating the subscriber or account information against a database.

In step 264, the mobile command server 130 can transmit a control message to a cloud-based service. In step 268, cloud-based service can respond to the API function call with API function returns that report the status of the command to the mobile command server 130. In one embodiment, the mobile command server 130 can receive status information, such as determining if a cloud-based service is enabled. In one embodiment, the mobile command server 130 can report to the mobile communication device 116A on the status of a requested command.

Figure 3:
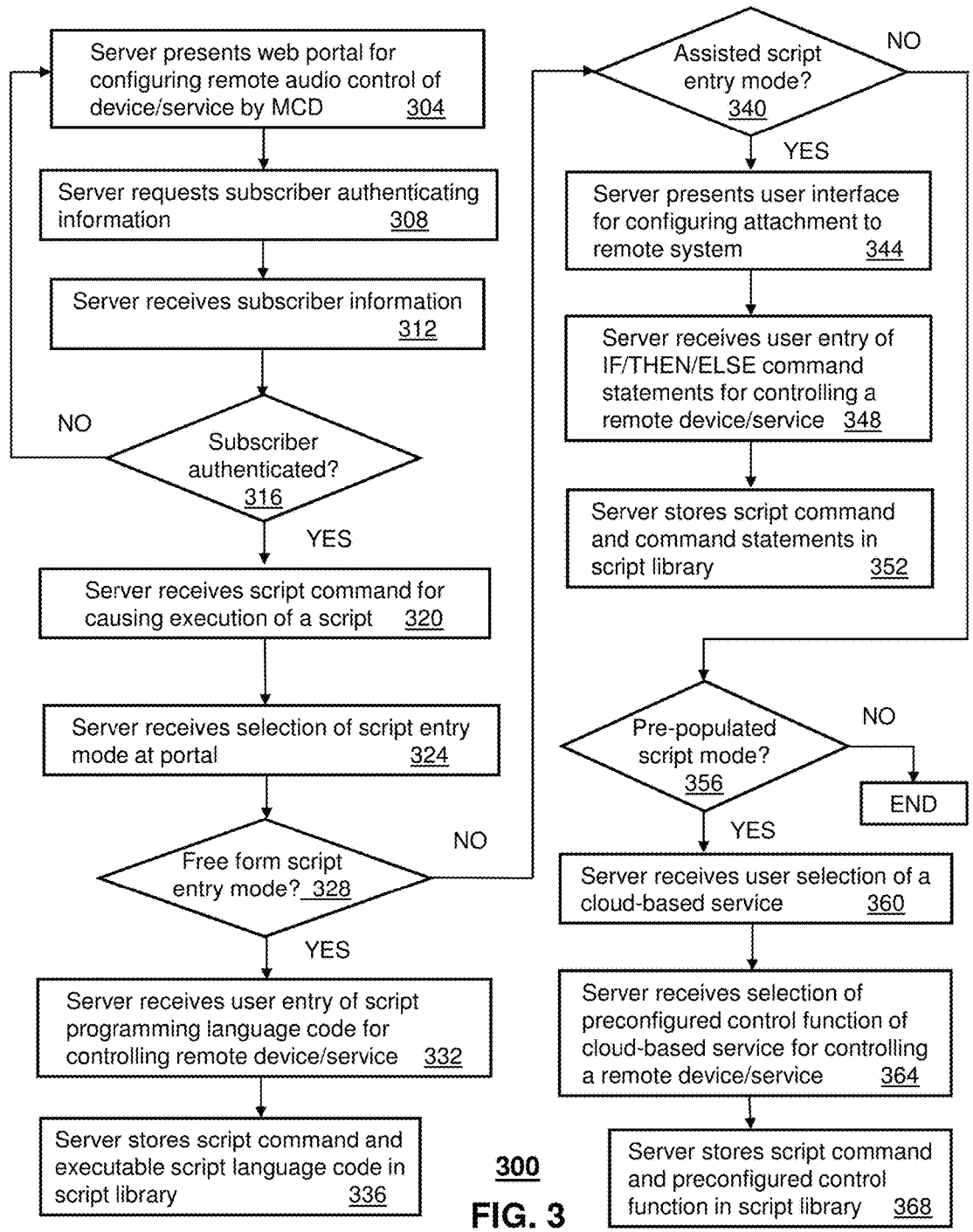

FIG. 3 depicts an illustrative embodiment of a method operating in portions of the systems and devices described in FIGS. 1 and 4-5. Method 300 can begin with step 304, which the mobile command server 130 present a web portal for configuring remote audio/voice control of a device or service by a mobile communication device 116A. In one embodiment, the web portal is accessible to mobile communication devices 116A or other computer devices 194 by logging onto the web portal. In step 308, the mobile command server 130 requests authenticating information from the subscriber. In step 312, the mobile command server 130 can receive the subscriber information and, in step 316, verify the subscriber's identity and right to access the mobile command services. In one embodiment, the portal can verify a user name and password that have been established for subscribers to the IMS network 150.

In step 320, the mobile command server 130 can receive at the web portal a script command that subscribers desire to associate with an executable script. In one embodiment, the web portal can allow a subscriber to enter a text command that the subscriber desires to utilize as a voice command for controlling remote devices and/or services. In one embodiment, the web portal can display a graphic user interface screen that can allow a subscriber to add, delete, and/or modify scripts. The web portal of the mobile command server 130 can provide any of several options for selecting, adding, editing, and/or deleting scripts from the script library. In step 324, the mobile command server 130 can receive a selection of a mode for entry of a script at the web portal. In one embodiment, the subscriber can choose between free form, assisted, and prepopulated entry modes.

In step 328, the mobile command server 130 can determine if the subscriber has selected free form script entry mode and, if true, can receive user entry of script programming language code for controlling a remote device or service in step 332. In one embodiment, a subscriber can enter or modify scripts according to a free form mode. In one embodiment, the mobile command server 130 can be directed, via the script, to connect to a resource, such as a cloud-based service 162, to provide authentication to the resource, and to execute functional calls to the resource. In step 336, the mobile command server 130 can store the script command and the script programming language code in a script library 160.

In step 340, the mobile command server 130 can determine if the subscriber has selected assisted script entry mode and, if true, can present a user interface for configuring attachment to a remote system in step 344. In one embodiment, the script is created from a script programming language but the web portal application fills in necessary script programming code according to subscriber choices and selections that occur as the subscriber is guided through steps in the user interface. In step 348, the subscriber can enter logical IF/THEN/ELSE statements, which the web portal application of the mobile command server 130 converts into script language code. In step 352, the mobile command server 130 can store the script command and the script programming language code in a script library 160.

In step 356, the mobile command server 130 can determine if the subscriber has selected pre-populated entry mode and, if true, can receive a user selection of a cloud-based service in step 360. In one embodiment, the subscriber selects from preconfigured services that are available from one or more cloud-based services. In one embodiment, each cloud-based service can generate a set of preconfigured, externalized API functions that control known features of their services, where the externalized API functions are available for calling by an authenticated client. In one embodiment, the web portal application of the mobile command server 130 can provide lists of preconfigured functions for various cloud-based services and can arrange the lists according to subject and/or cloud-based service. In step 364, the mobile command server 130 receives subscriber selects of functions that they wish to execute in a script that the subscriber has associated with a script command. In step 368, the mobile command server 130 can store the script command and the preconfigured control function in a script library 160. In one embodiment, the web portal application of the mobile command server 130 can allow the subscriber to test individual functions and/or completed scripts by executing via the web portal to allow the subscriber to verify that the script is correctly generated to control the remote device and/or service.

FIG. 4 depicts an illustrative embodiment of a first communication system 400 for delivering media content. The communication system 400 can represent an Internet Protocol Television (IPTV) media system. Communication system 400 can be overlaid or operably coupled with the system of FIG. 1 that can be utilized for providing remote control of devices and services via mobile communication devices as another representative embodiment of communication system 400. In one embodiment, the system 400 can include one or more servers 130 and 135 associated with an IMS network 150. In one embodiment, a mobile command server 130 can receive communications from mobile communication devices 116A over a mobility network 117. The mobile command server 130 can provide voice or audio command services to the mobile communication device 116A. Simple voice commands can be captured at the mobile communication device 116A for the purpose of controlling devices and/or services at a subscriber's premises and/or accessible via the cloud or Internet. The mobile command server 130 can direct an authentication server 135 to perform an authentication process to insure that the voice commands are originating from a subscriber to the system 400. The mobile command server 130 can then match the received voice commands to preconfigured scripts at a script library 170. The scripts can provide one or more machine and/or network commands that can control remote functions, such as cloud-based services, and/or remote devices, such as home security systems.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 106 for demodulating, decoding, encoding, and/or distributing broadcast channels to the media devices 108. The media processors 106 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a mobile command server for providing remote audio command services to mobile communication devices 116A over the ISP network 432.

Communication system 400 can also provide for all or a portion of the computing devices 130 to function as a mobile command server 130. The mobile command server 130 can use computing and communication technology to perform function 462, which can include among other things, receiving communications from mobile communication devices 116A over a mobility network 117, providing voice or audio command services to the mobile communication device 116A, directing an authentication server 135 to perform an authentication process to insure that the voice commands are originating from a subscriber to the system 400, matching the received voice commands to preconfigured scripts at a script library 170, and transmitting control messages to command remote devices and/or services. The media processors 106 and wireless communication devices 116 can be provisioned with software functions 464 and 465, respectively, to utilize the services of mobile command server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with the system of FIG. 1 that can be utilized for providing remote control of devices and services via mobile communication devices and communication systems 100 and 400 as another representative embodiment of communication systems 100 and 400. In one embodiment, the system 500 can include one or more servers 130 and 135 associated with the IMS network 150. In one embodiment, a mobile command server 130 can receive communications from mobile communication devices 116A over a mobility network 117. The mobile command server 130 can provide voice or audio command services to the mobile communication device 116A. Simple voice commands can be captured at the mobile communication device 116A for the purpose of controlling devices and/or services at a subscriber's premises and/or accessible via the cloud or Internet. The mobile command server 130 can direct an authentication server 135 to perform an authentication process to insure that the voice commands are originating from a subscriber to the system 500. The mobile command server 130 can then match the received voice commands to preconfigured scripts at a script library 170. The scripts can provide one or more machine and/or network commands that can control remote functions, such as cloud-based services, and/or remote devices, such as home security systems.

Communication system 500 can comprise a Home Subscriber Server (HSS) 540, a tElephone NUmber Mapping (ENUM) server 530, and other network elements of an IMS network 150. The IMS network 150 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating"

and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 150 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 150 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The mobile command server 130 of FIG. 4 can be operably coupled to the second communication system 500 for purposes similar to those described above. Mobile command server 130 can perform function 570 and thereby provide remote audio/voice command services to the CDs 501, 502, 503 and 505 of FIG. 5. CDs 501, 502, 503 and 505, which can be adapted with software to perform function 572 to utilize the services of the mobile command server 130. Mobile command server 130 can be an integral part of the application server(s) 517 performing function 574, which can be substantially similar to function 462 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
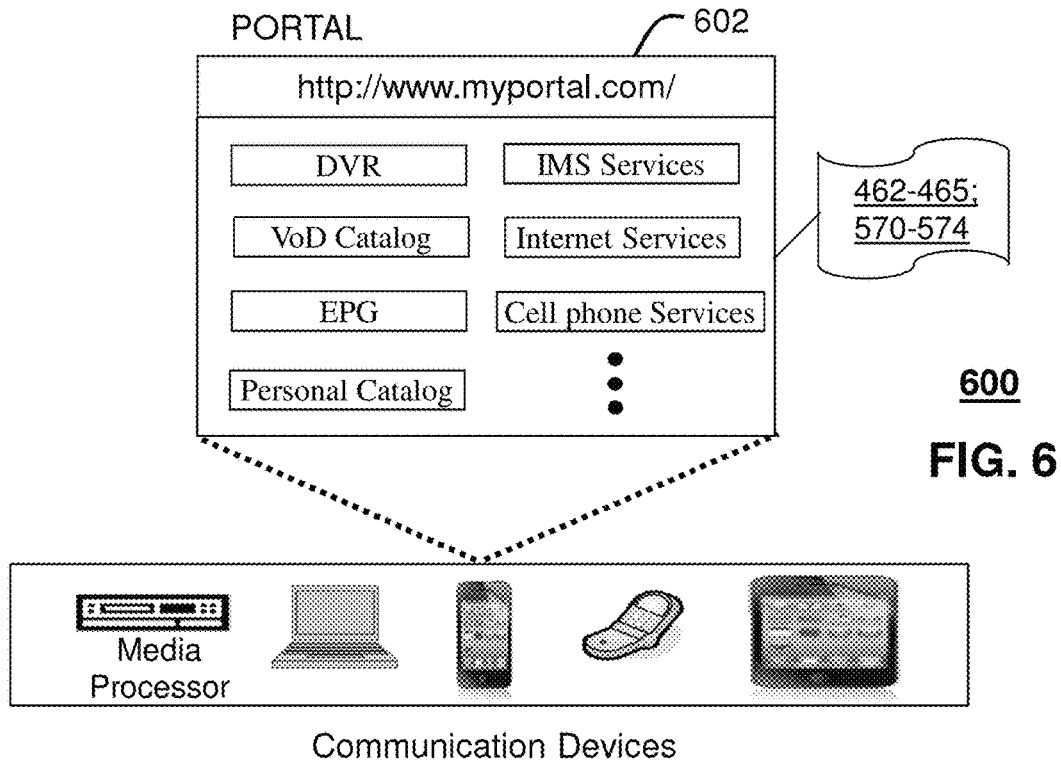
FIG. 6 depicts an illustrative embodiment of a web portal for configuring remote access and control of devices and services according to the communication systems of FIGS. 1, 4, and 5.

FIG. 6 depicts an illustrative embodiment of a web portal 602 which can be hosted by server applications operating from the computing devices 130 of the communication system 100 illustrated in FIG. 1. Communication system 600 can be overlaid or operably coupled with communication system 400, and/or communication system 500 as another representative embodiment of system of FIG. 1, communication system 400, and/or communication system 500. In one embodiment, a mobile command server 130 can receive subscriber information at a web portal 602 and can authenticate the subscriber information according to a subscriber database to enable modification of a script library. The mobile command server 130 can also receive at the web portal 602 a script command for causing execution of a first script in the script library responsive to receiving an audio command from a mobile communication device, where a speech to text conversion of the audio command can generate a text command that at least approximately matches the script command. The mobile command server 130 can further receive a selection of a script entry mode for the first script at the web portal 602, receive entry of the first script at the web portal 602 according to the script entry mode, and, in turn, store the first script in the script library for subsequent executing of the first script.

The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-465, and 570-574 to adapt these applications as may be desired by subscribers and service providers of communication systems 400-500.

Figure 7:
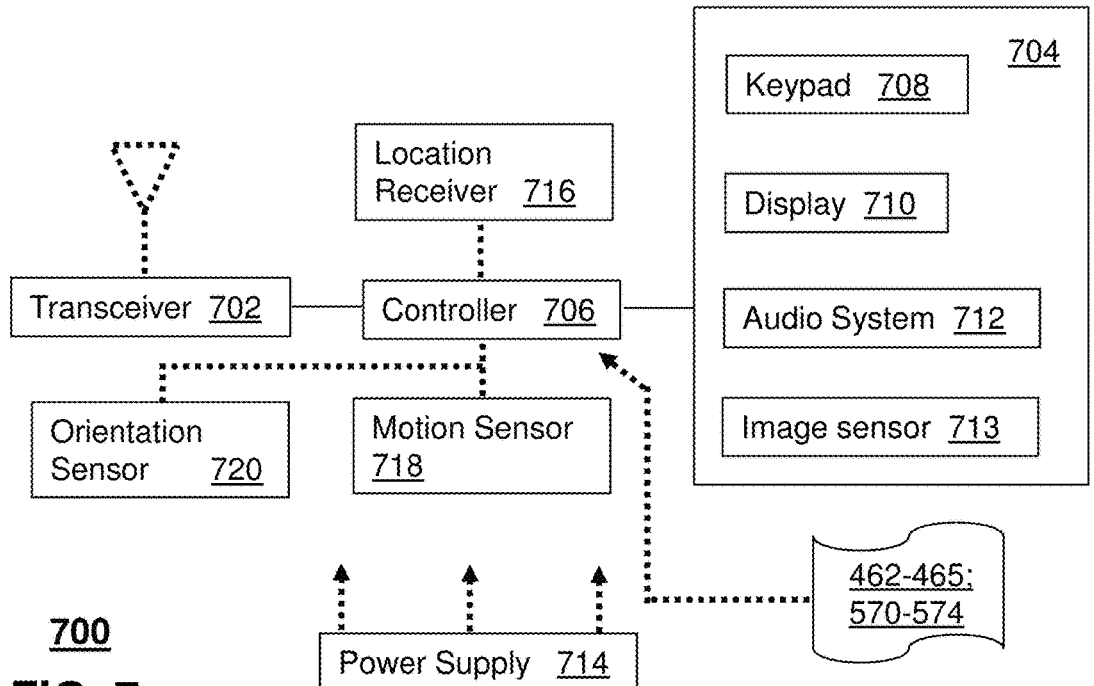
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and 4-5. In one embodiment, a mobile command server 130 can receive communications from a communication device 700 over a mobility network 117. The mobile command server 130 can provide voice or audio command services to the communication device 700. Simple voice commands can be captured at the communication device 700 for the purpose of controlling devices and/or services at a subscriber's premises and/or accessible via the cloud or Internet. The mobile command server 130 can direct an authentication server 135 to perform an authentication process to insure that the voice commands are originating from a subscriber to the system 400. The mobile command server 130 can then match the received voice commands to preconfigured scripts at a script library 170. The scripts can provide one or more machine and/or network commands that can control remote functions, such as cloud-based services, and/or remote devices, such as home security systems.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of [system of FIG. 1, communication system 400, and communication system 500. In addition, the controller 706 can be adapted in various embodiments to perform the functions 462-465 and 570-574, respectively.

Upon reviewing the aforementioned embodiments, it would be evident to an artisan with ordinary skill in the art that said embodiments can be modified, reduced, or enhanced without departing from the scope and spirit of the claims described below. For example, in one embodiment, if the mobile command server 130 cannot sufficiently match the text command to a script command, then the mobile command server 130 can notify the subscriber that the requested command cannot be found. In one embodiment, the mobile command server 130 can repeat back to the subscriber the text command that the mobile command server 130 has generated from the voice-text conversion so that the subscriber receives immediate feedback indicating how the mobile command server 130 is handling the conversion.

In another embodiment, the mobile command server 130 can parse the text command for variables and/or numbers that used for configuring a remote device and/or process and then compare the supplied variables and/or numbers to acceptable ranges. For example, the subscriber can speak the phrase, "Set thermostat to 90 degrees." The mobile command server 130 can parse the phrase to detect the variable "90." Upon recognizing the presence of the number, the mobile command server 130 compare the provided variable to a variable range for the thermostat that is stored with the script associated with the command "Set thermostat to" in the script library. If the mobile command server 130 determines that the provided variable is out of the acceptable range (e.g., Acceptable thermostat settings are configured as 60 degrees to 85 degrees), then the mobile command server 130 can report the problem to the caller. In another embodiment, the mobile command server 130 can correct the out-of-range input by substituting an in-range value, such as 85 degrees. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
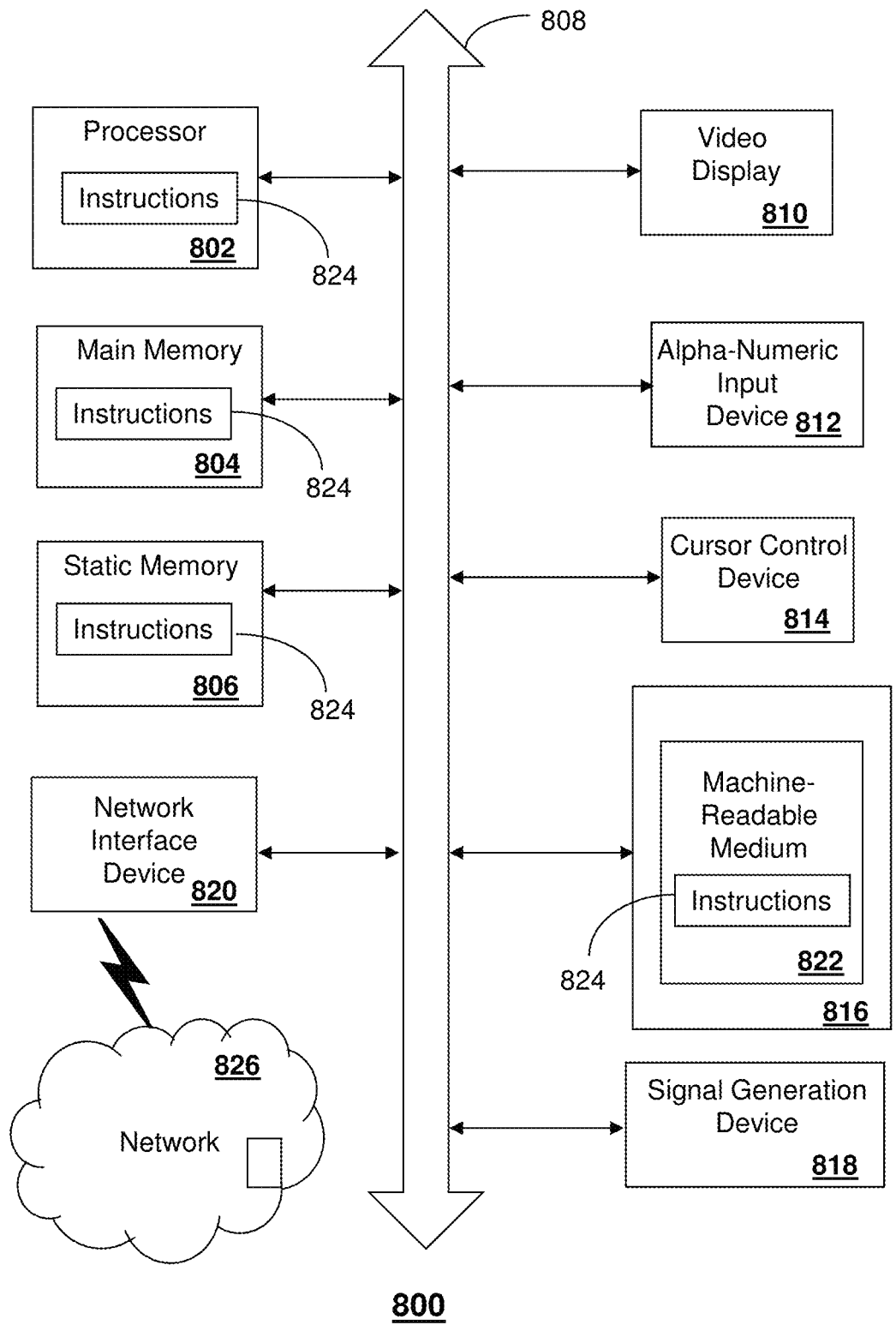
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the mobile command server 130, mobile communication device 116A, gateway device 104A-D, and/ or media processor 406 of FIGS. 1, 4, and 5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a server device comprising a processing system including a processor, a request from a mobile communication device to control a remote device, wherein the request includes an identifier associated with the mobile communication device;
   determining, by the server device, a subscriber according to the identifier associated with the mobile communication device;
   transmitting, by the server device, audible instructions to the mobile communication device to request authentication information;
   receiving, by the server device, from the mobile communication device, the authentication information including a first facial image captured at the mobile communication device;
   determining, by the server device, whether the first facial image that is received substantially matches a stored facial image of the subscriber to authenticate the subscriber;
   responsive to authentication of the subscriber, determining, by the server device, if an account associated with the subscriber is configured to support audio control of the remote device;
   receiving, by the server device, an audio command from the mobile communication device via a first communication network responsive to the determining that the account is configured to support the audio control of the remote device;
   converting, by the server device, the audio command to a text command;
   transmitting, by the server device, the text command back to the mobile communication device that originates the audio command;
   identifying, by the server device, a variable part of the text command and a non-variable part of the text command;
   comparing, by the server device, the non-variable part of the text command to a plurality of script commands associated with a script library to at least approximately match the non-variable part of the text command to a first script command of the plurality of script commands, wherein the non-variable part of the text command comprises a logical statement, and wherein the comparing of the non-variable part of the text command to a plurality of script commands associated with a script library further comprises converting the logical statement to a script language code;

retrieving, by the server device, a first script from the script library according to the first script command;

identifying, by the server device, a variable value based on the variable part of the text command;

comparing, by the server device, the variable value to a range that is associated with the first script to determine whether the variable value is within the range;

generating, by the server device, a control message according to the first script responsive to determining that the variable value is within the range, wherein the control message includes the variable value;

transmitting, by the server device, the control message to an application programming interface service of a computing device via a second communication network, wherein the application programming interface service directs the remote device to perform a function according to the control message, and wherein the control message further comprises identification data that is used by the application programming interface service to authenticate the control message to the subscriber that is associated with the remote device; and receiving, by the server device, a response message from the application programming interface service via the second communication network indicating a status associated with performance of the function by the remote device.

2. The method of claim 1, wherein the authentication further comprises:

determining, by the server device, whether to accept the first facial image based on a timestamp associated with the first facial image.

3. The method of claim 2, wherein the authentication further comprises identifying, by the server device, a base station used for the request from the mobile communication device.

4. The method of claim 1, further comprising:

converting, by the server device, the text command into a machine-generated audio command; and transmitting, by the server device, the machine-generated audio command to the mobile communication device, wherein the mobile communication device reproduces the machine-generated audio command for the subscriber.

5. The method of claim 4, further comprising receiving, by the server device, an acknowledgement of the machine-generated audio command from the mobile communication device, wherein the comparing of the text command is responsive to receiving the acknowledgement.

6. The method of claim 1, further comprising correcting, by the server device, the variable value to a value that is within the range responsive to determining that the variable value is not within the range.

7. The method of claim 1, further comprising transmitting, by the server device, results information to the mobile communication device according to the response message that is received from the application programming interface service.

8. The method of claim 7, wherein the results information comprises one of an electronic mail message or a short message service message.

9. The method of claim 1, further comprising receiving, by the server device, a call from the mobile communication device, wherein the call indicates a request for performing the audio control.

10. The method of claim 1, wherein the authentication further comprises:

receiving, by the server device, a voice sample from the mobile communication device via the first communication network, wherein the voice sample is captured by the mobile communication device as directed by the server device;

comparing, by the server device, the voice sample to a known voice sample associated with the subscriber to at least approximately match the voice sample to the known voice sample; and enabling, by the server device, performing of the audio control by the mobile communication device according to the known voice sample that is matched.

11. A device, comprising:

a memory to store executable instructions; and a processing system including a processor communicatively coupled to the memory, wherein the processing system, responsive to executing the executable instructions, performs operations comprising:

receiving subscriber information for a subscriber at a web portal;

authenticating the subscriber information according to a subscriber database to enable modification of a script library;

receiving a selection of a script entry mode for a first script in a script library at the web portal;

receiving entry of the first script at the web portal according to the script entry mode; and storing the first script in the script library for subsequent executing of the first script, wherein a control message according to the first script is transmitted to an application programming interface service to perform a function at a remote device responsive to:

receiving, a request from a mobile communication device to control the remote device, wherein the request includes an identifier associated with the mobile communication device;

identifying the subscriber according to the identifier associated with the mobile communication device;

transmitting text instructions to the mobile communication device to request authentication information;

receiving the authentication information including a first facial image captured at the mobile communication device;

determining whether the first facial image that is received substantially matches a stored facial image of the subscriber to authenticate the subscriber;

responsive to authentication of the subscriber, determining if an account associated with the subscriber is configured to support audio control of the remote device;

receiving an audio command from the mobile communication device responsive to the determining that the account is configured to support the audio control of the remote device;

converting the audio command to a text command;

providing the text command to the mobile communication device that originates the audio command;

identifying a variable part of the text command and a non-variable part of the text command;
comparing the non-variable part of the text command to a plurality of script commands associated with the script library to at least approximately match the non-variable part of the text command to a first script command of the plurality of script commands, wherein the non-variable part of the text command comprises a logical statement, and wherein the comparing of the non-variable part of the text command to a plurality of script commands associated with a script library further comprises converting the logical statement to a script language code;
retrieving the first script from the script library according to the first script command;
identifying a variable value based on the variable part of the text command;
comparing the variable value to a range that is associated with the first script to determine whether the variable value is within the range; and
generating the control message according to the first script responsive to determining that the variable value is within the range, wherein the control message includes the variable value and identification data useable by the application programming interface service to authenticate the control message that is associated with the remote device.

12. The device of claim 11, wherein the script entry mode is entry of a script programming language code without assistance.

13. The device of claim 11, wherein the script entry mode is assisted entry of conditional statements.

14. The device of claim 11, wherein the first script corrects the variable value to a value within the range responsive to determining that the variable value is not within the range.

15. The device of claim 11, wherein the application programming interface service is configured to direct the remote device to perform a function according to the control message.

16. A non-transitory, machine-readable storage medium, comprising executable instructions, which, when executed by a processing system comprising a processor, cause the processor to perform operations comprising:
receiving a request from a mobile communication device to control a remote device, wherein the request includes an identifier associated with the mobile communication device;
determining a subscriber according to the identifier;
transmitting audible instructions to the mobile communication device to request authentication information;
receiving, from the mobile communication device, the authentication information including a first facial image captured at the mobile communication device;
determining whether the first facial image that is received substantially matches a stored facial image of the subscriber to authenticate the subscriber;
responsive to authentication of the subscriber, determining if an account associated with a subscriber is configured to support audio control of the remote device;
receiving an audio command from the mobile communication device via a first communication network for performing the audio control of the remote device;
converting the audio command to a text command responsive to determining that the account is configured to support the audio control of the remote device;
transmitting the text command that is generated to the mobile communication device;
identifying a variable part of the text command and a non-variable part of the text command, wherein the non-variable part of the text command comprises a logical statement;
comparing the non-variable part of the text command to a plurality of script commands associated with a script library to at least approximately match the non-variable part of the text command to a first script command of the plurality of script commands, wherein the comparing of the non-variable part of the text command to a plurality of script commands associated with a script library further comprises converting the logical statement to a script language code;
retrieving a first script from the script library according to the first script command;
detecting a variable value based on the variable part of the text command;
comparing the variable value that is detected to a range that is associated with the first script to determine whether the variable value is within the range;
generating a control message according to the first script responsive to determining that the variable value is within the range, wherein the control message includes the variable value; and
transmitting a control message relating to the first script to an application programming interface service of a computing device via a second communication network, wherein the application programming interface service directs the remote device to perform a function according to the control message.

17. The non-transitory, machine-readable storage medium of claim 16, further comprising executable instructions to cause the processor to perform operations comprising:
receiving a first voice sample from the mobile communication device via the first communication network, wherein the first voice sample is captured by the mobile communication device;
comparing the first voice sample to a known voice sample associated with the subscriber to at least approximately match the first voice sample to the known voice sample; and
enabling the audio control of the remote device by the mobile communication device according to the known voice sample that are matched.

18. The non-transitory, machine-readable storage medium of claim 16, further comprising executable instructions to cause the processor to perform operations comprising connecting to the computing device according to one of a secure shell protocol or a web service protocol.

19. The non-transitory, machine-readable storage medium of claim 16, receiving a call from the mobile communication device, wherein the call indicates the request for performing the audio control of the remote device.

20. The non-transitory, machine-readable storage medium of claim 16, wherein the control message further comprises identification data that is used by the application programming interface service to authenticate the control message that is associated with the remote device.

* * * * *